United States Patent [19]

Udd et al.

[11] Patent Number: 5,422,772
[45] Date of Patent: Jun. 6, 1995

[54] SECURE FIBER OPTIC NETWORKS

[75] Inventors: Eric Udd; Stuart E. Higley, both of Huntington Beach, Calif.

[73] Assignee: McDonnell Douglas Corporation, Huntington Beach, Calif.

[21] Appl. No.: 772,626

[22] Filed: Oct. 4, 1991

Related U.S. Application Data

[63] Continuation of Ser. No. 628,950, Dec. 14, 1990, abandoned, which is a continuation of Ser. No. 409,509, Aug. 25, 1989, abandoned.

[51] Int. Cl.$^6$ .............................. H04B 10/02
[52] U.S. Cl. .................... 359/119; 359/118; 359/164; 359/173; 359/183; 359/188; 359/195
[58] Field of Search ............. 367/149; 356/350; 359/118-121, 152, 154, 157, 164, 168, 173, 174, 178-180, 183, 188, 189, 195

[56] References Cited

U.S. PATENT DOCUMENTS

| | | | |
|---|---|---|---|
| 2,531,951 | 11/1950 | Shamos et al. | 455/616 |
| 2,707,749 | 5/1955 | Mueller | 455/616 |
| 3,366,792 | 1/1968 | Ohm | 372/27 |
| 3,408,498 | 10/1968 | Ohm | 330/4.3 |
| 3,495,189 | 2/1970 | LeCraw | 330/4.3 |
| 3,584,220 | 6/1971 | Nomura et al. | 455/605 |
| 3,828,185 | 8/1974 | Vandling | 455/605 |
| 3,936,748 | 2/1976 | Bomke | 380/59 |
| 4,002,896 | 1/1977 | Davies et al. | 455/610 |
| 4,187,404 | 2/1980 | Deman et al. | 379/93 |
| 4,433,915 | 2/1984 | Hanse | 356/350 |
| 4,434,510 | 2/1984 | Lemelson | 455/603 |
| 4,456,376 | 6/1984 | Carrington et al. | 356/350 |
| 4,456,377 | 6/1984 | Shaw et al. | 356/350 |
| 4,479,264 | 10/1984 | Lockett et al. | 455/605 |
| 4,482,980 | 11/1984 | Korowitz et al. | 364/900 |
| 4,540,243 | 9/1985 | Fergason | 350/337 |
| 4,642,804 | 2/1987 | Personick | 370/3 |
| 4,658,394 | 4/1987 | Cheng et al. | 370/3 |
| 4,704,713 | 11/1987 | Haller et al. | 370/3 |
| 4,727,601 | 2/1988 | Konishi | 455/612 |
| 4,736,465 | 4/1988 | Bobey et al. | 455/612 |
| 4,933,990 | 6/1990 | Mochizuki et al. | 455/602 |

FOREIGN PATENT DOCUMENTS

| | | | |
|---|---|---|---|
| 0087946 | 7/1981 | Japan | H04B 9/00 |
| 0103549 | 8/1981 | Japan | H04B 9/00 |
| 0023343 | 2/1982 | Japan | H04B 9/00 |
| 1577603 | 10/1980 | United Kingdom | H04L 9/00 |

OTHER PUBLICATIONS

E. Udd et al, "Fiber-Optic Sensor Systems for Aerospace Applications"; No Date.

Nagata et al, "Intra-Office Optical Fiber Transmission Systems"; Review of the Electrical Communications Lab.S; (vol. 27, No. 11-12; Nov.-Dec., 1979; pp. 1057-1068); 455/606.

J. Lipson, "Subscriber Loop Architecture"; A.T.&T Tech. Disclosure No. 75, (Sep. 1984, pp. 9-10).

Dakin et al, "A Novel Distributed Optical Fibre Sensing System Enabling Location of Disturbances in a SAGNAC Loop Interferometer"; SPIE vol. 838 Fiber Optic and Laser Sensors V (1987), pp. 325-328.

H. W. Fowler, *A Dictionary of Modern English Usage*, "-US", p. 669; (Oxford University Press, New York; 1985).

Primary Examiner—Bernarr E. Gregory
Attorney, Agent, or Firm—George W. Finch; John P. Scholl; Roger C. Turner

[57] ABSTRACT

Sagnac interferometer based secure communications systems are integrated into high speed data transfer rate networks using a smaller number of separate fiber optic cables than would be required if networks were constructed from pluralities of point-to-point systems. Redundancy can be provided in the networks to enable the network to operate even if multiple failures occur in the network.

30 Claims, 5 Drawing Sheets

SECURE FIBER OPTIC NETWORKS

The U.S. Government has a paid-up license for the invention claimed herein, acquired under Contract No. F 19628-86-C-0098.

This is a continuation of application Ser. No. 07/628,950, filed on 14 Dec. 1990, now abandoned, which was a continuation of Ser. No. 07/409,509, filed on 25 Aug. 1989, now abandoned.

BACKGROUND OF THE INVENTION

Available, state of the art, secure communication systems normally are based on electronic encryption to achieve security. These secure communication systems take data and, using special algorithms, process it in a computer into a form that cannot be reconverted into usable data unless the receiver of the encrypted data has the proper algorithms, conversion electronics and software key codes. The encryption and decryption processes are complex and computer processor intensive, requiring processor speeds approximately an order of magnitude faster than the effective data transmission rate of the communication system over which the data is to be sent. When data is to be transmitted, computer to computer, the relative slowness of the encryption process either slows down the transmission rate or requires the users to use expensive distributed processing and multiplex schemes.

Electronic encryption methods are practical for point to point secure communications, but are difficult to implement into communication networks because of the difficulty of handling codes and code changes for each user on the network. Also, the handling of multiple codes at various locations increases the chance that an unauthorized entity will be able to gain access to the codes and be able to decrypt data. In most instances the communication lines over which the secure data is transmitted, are available for unscrupulous persons to tap into the data. In most instances the communication lines over which the secure data is transmitted, are available for unscrupulous persons to tap into the data. If the code has been obtained and access is possible, such persons can intercept data and/or change data without being detected.

Therefore, what is needed are secure communication systems which can transfer data at extremely high speeds over a network and which do not require complex codes, code changes or prevention of access to communication lines.

There are advanced high speed systems, which do not need encryption because the data transferred thereover is in a physical form that defies interception and demodulation, which are based on Sagnac interferometers. Such Sagnac interferometer based secure fiber optic communication systems are described in U.S. patent application Ser. Nos. 880,664 and 880,685, filed Jun. 11, 1986 by Eric Udd and are assigned to McDonnel Douglas Corporation now respectively U.S. Pat. Nos. 5,223,967 and 5,274,488. Point to point systems are described in those applications which are at least as secure as any other secure communication system, which can operate at extremely high data rates, the rate usually being limited by the input and output electronics rather than by limitations of the system itself, and which cannot be tapped at any location along the system to gain unauthorized access to the data thereon.

SUMMARY OF THE INVENTION

The devices and methods of the present invention are improvements that allow the Sagnac interferometer based secure fiber optic communication systems described in U.S. patent application Ser. Nos. 880,684 and 880,685, both filed Jun. 11, 1986 by Eric Udd and assigned to McDonnel Douglas Corporation, to be incorporated into networks, now respectively U.S. Pat. Nos. 5,223,967 and 5,274,488.

The present invention also allows a plurality of secure fiber links to be integrated into a network whose fiber pathways are substantially less than if separate links were provided between each communication site. The simplest embodiment of a secure fiber optic link based on the Sagnac interferometer includes a transmittal portion, a received portion and a pair of fiber optic lines connecting the transmitter to the receiver portion. The receiver portion includes a light source, a detector, and a fiber beamsplitter that is used to generate counter-propagating light in the fiber optic lines from the output of the light source in a Sagnac loop. The transmitter portion includes a phase modulator which is used to impress a relative phase difference between the counter-propagating light beams in accordance with the data being transmitted. The relative phase difference between the light beams carries the data to the receiver section where it is combined to form an interference pattern at the detector. The proper interference pattern exists only at a very small location at a specific distance from the transmitter. Therefore, the transmitted data is undetectable outside the receiver portion.

The present invention also enables a single transmitter station to be used to support two receivers by switching between two Sagnac transmission links using optical switches. The optical switches can be mechanical, electro-optical, or acousto-optical devices. A single transmitter station may also support many independent receiver stations by including several phase modulators in a single transmitter location. This method is particularly suitable for supporting "star" networks. By combining a system with a single transmission station supporting many receiver stations with a system with a single receiver station supporting many transmission stations, full duplex secure communication networks may be constructed supporting many terminals. Star couplers may be used to form a broadcast network allowing multiple receivers and transmitters to share information on a common link.

Wavelength division multiplexing techniques enable full duplex link communications between two points using a single fiber optic pair. The system of the present invention effectively establishes two independent Sagnac loops operating simultaneously at different wavelengths. The system results in a transmitter and receiver, operating at one of the two wavelengths used, forming complete transmitter and receiver pairs on each and of the dual fiber link.

In addition, wavelength division multiplexing methods may also be used to divide a single Sagnac loop into multiple elements each supporting a single transmitter station. Wavelength division multiplexing can enable construction of stations along a single loop with color coded bypasses to restrict the flow of information to the desired terminals. Restricted information flow within the network gives the advantage of multi-layered security.

BRIEF DESCRIPTION OF THE DRAWINGS

The above mentioned and other features and objects of this invention will become more apparent after reference to the following description taken in conjunction with the accompanying drawings, in which.

DESCRIPTION OF THE PREFERRED EMBODIMENTS

Figure 1:
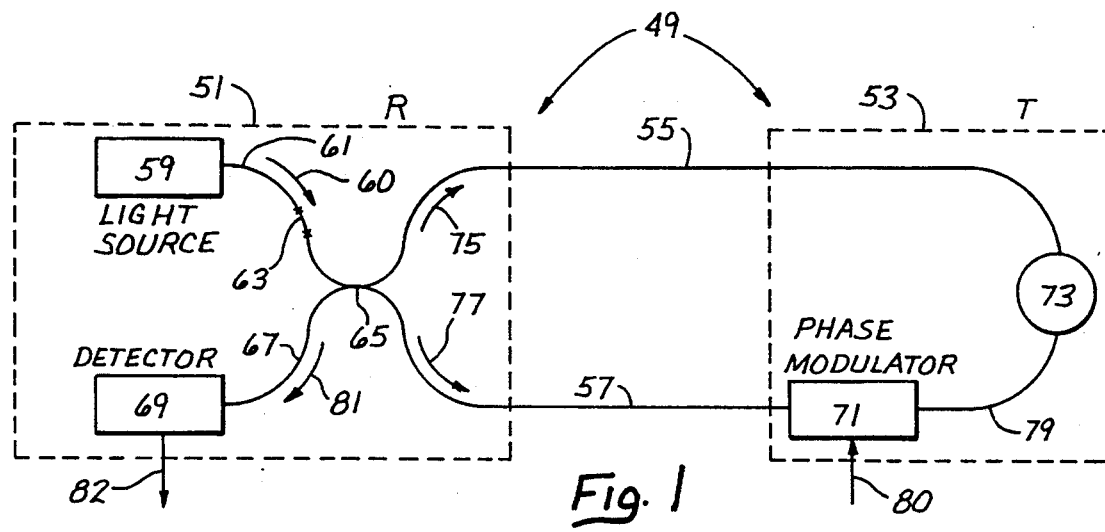
FIG. 1 is a block diagram of a basic Sagnac interferometer secure fiber optic communication link constructed in accordance with an inventor's prior patent applications.

FIG. 1 illustrates a basic Sagnac interferometer secure fiber optic communication link 49. The basic link 49 comprises a receiver section 51 and a transmitter section 53 interconnected by a pair of single mode fiber optic cables 55 and 57.

The components of the receiver section include light source 59 which supplies a beam of light 60 into the link 49. The light source 59 is connected to a pigtailed optical fiber 61. The pigtailed optical fiber 61 is connected to a depolarizing element 63 to scramble the polarization of the light beam 60. Depolarizing element 63 is connected to a four port central fiber optic beamsplitter 65. One of the other ports of the central fiber optic beamsplitter 65 is connected to a fiber link 67. The fiber link 67 is connected to a detector 69 which is capable of converting light amplitude modulated signals into electrical signals. The pair of fiber optic cable links 55 and 57 are connected to the other two ports of fiber optic beamsplitter 65.

In the transmitter section 53, a phase modulator 71 is connected to fiber optic cable link 57. A typical phase modulator 71 can be constructed by surrounding a piezoelectric core with an optical fiber, or by surrounding a fiber with a piezoelectric covering. A random pathlength generator 73 is optically connected between the modulator 71 and the fiber optic link 55.

The operation of the link 49 begins with the energizing of the light source 59, which may be a light emitting diode or laser diode. The light source 59 couples the beam of light 60 into the pigtailed optical fiber 61 which for optimum operation is a single mode fiber. The light beam 60 is then coupled into the central fiber optic beamsplitter 65 which is used to generate a clockwise propagating light beam indicated by directional arrow 75, and a counterclockwise propagating light beam indicated by directional arrow 77.

The counterclockwise light beam 77 traverses the fiber optic link 57, the phase modulator 71, the random pathlength generator 73 and the fiber optic link 55. The clockwise propagating light 75 traverses the identical path in the opposite direction. The two beams recombine interferometrically at the beamsplitter 65 and the resultant amplitude modulated signal passes through the fiber link 67 to the detector 69.

The data to be securely communicated in the form of an electrical data stream 80 applied as the input to the phase modulator 71. The phase modulator 71, located within transmitter section 53, converts the electrical data stream 80 into an optical data stream represented by relative phase differences between the counterpropagating light beams 75 and 77 in the Sagnac loop. When these two beams 75 and 77 recombine interferometrically at the beamsplitter 65 in the receiver section 51, the resultant amplitude modulated optical signal 81 is transmitted to the detector 69 by the fiber link 67 and is reconverted thereby into an electrical output signal 82 corresponding to the input data stream 80. Theoretical details concerning the operation of the basic system may be found in patent application Ser. Nos. 880,684 and 880,685 by Eric Udd.

Figure 2:
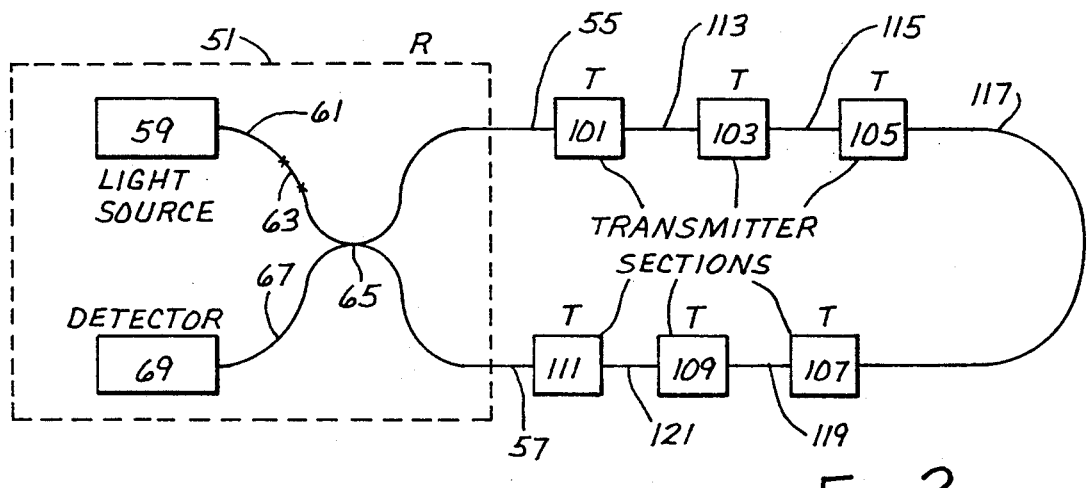
FIG. 2 is a block diagram of a basic Sagnac interferometer based secure communication system supporting multiple transmitting units.

To form a rudimentary network, multiple transmitter stations may be added to the Sagnac interferometer loop as shown in FIG. 2. Receiver section 51 illustrated in FIG. 2 is identical to receiver section 51 illustrated in FIG. 1. A series of transmitter sections 101, 103, 105, 107, 109, and 111 are connected together by a series of fiber links 113, 115, 117, 119, and 121. Transmitter section 101 is connected to fiber link 55 and transmitter section 111 is connected to fiber link 57. Each of the transmitter sections 101, 103, 105, 107, 109, and 115 consists of a phase modulator 71 and a random pathlength generator 73 as shown within transmitter section 53 of FIG. 1.

The phase modulator 71 of FIG. 1, that is used to impress information onto the loop of FIG. 2, can segregate the signals to be impressed on the loop by operating in each of the transmitter sections 101, 103, 105, 107, 109, and 115 at different carrier frequencies and using frequency modulation techniques. Alternatively, time division multiplexing may be used. Theoretical details on the operation of the embodiment of FIG. 2 and its implementation in a network may be found in patent application Ser. Nos. 880,684 and 880,685 by Eric Udd.

Figure 3:
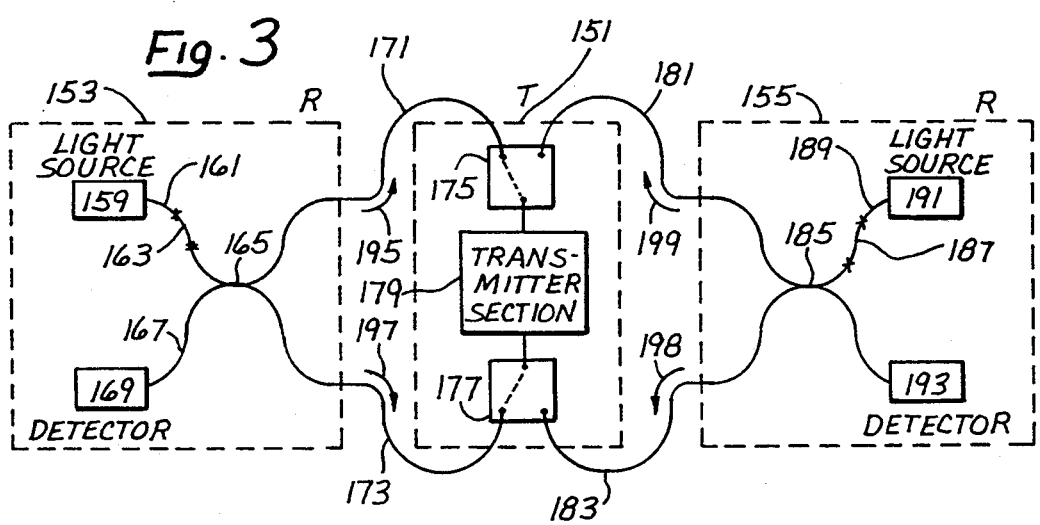
FIG. 3 is a detailed schematic of a transmitting station supporting multiple receivers by using optical switches.

FIG. 3 illustrates a single transmitting section 151 supporting two receiving sections 153 and 155. FIG. 3 shows the system switched such that transmitter section 151 is enabled to send information to the receiver section 153.

A light source 159 is connected to a pigtailed optical fiber 161. Pigtailed optical fiber 161 is connected to a depolarizing element 163. Depolarizing element 163 is connected to a four port central fiber optic beamsplitter 165. One of the other ports of the central fiber optic beamsplitter 165 is connected to a fiber link 167. Fiber link 167 is connected to a detector 169. Detector 169 is used to convert light amplitude modulated signals into electrical signals. The pair of fiber optic cable links 171 and 173 are connected to the other two ports of fiber optic beamsplitter 165.

In the transmitter section 151, fiber optic cable link 171 is connected to one terminal of a first fiber optic switch 175. Fiber optic cable link 173 is connected to one terminal of a second fiber optic switch 177. Although first and second fiber optic switches 175 and 177 are shown having a pair of input terminals, any number of input terminals may be used. The first fiber optic switch 175 is connected into a transmitter section 179. Transmitter section 179 is equivalent to transmitter section 53 of FIG. 1.

Continuing to the right of FIG. 3, fiber optic switch 175 is connected to a fiber link 181, and second fiber optic switch 177 is connected to a fiber link 183. Fiber links 181 and 183 are connected into receiver section 155. Within receiver section 155, fiber link 181 and fiber link 183 are each connected to one port of a four port central beam splitter 185. One other port of central beamsplitter 185 is connected to a depolarizing element 187. Depolarizing element 187 is connected to a pigtailed optical fiber 189. Pigtailed optical fiber 189 is connected to a light source 191. The remaining port of central fiber optic beamsplitter 185 is connected to a detector 193. The configuration of receiver section 155 is essentially identical to that of receiver section 153 of FIG. 3 and receiver section 51 of FIGS. 1 and 2.

Light source 159 couples light into the fiber 161 and through the depolarizing element 163. The light is then split, by the central fiber optic beamsplitter 165, into a clockwise propagating light beam 195 whose direction is indicated by the direction arrow, and into a counterclockwise propagating light beam 195 whose direction is indicated by the direction arrow. The counterclockwise light beam 197 passes through fiber link 173 and into the transmitter section 151. Upon entering the transmitter section 151a the counterclockwise propagating light beam 197 then passes second fiber optic switch 177 and enters transmitter section 179. Within transmitter section 179a the light beam 197 is affected by a phase modulator (not shown) identical to phase modulator 71 of FIG. 1, and a random pathlength generator (not shown) identical to random pathlength generator 73 of FIG. 1.

Beam 197 then passes through first fiber optic switch 175, fiber link 171 and back to central fiber optic beamsplitter 165 of FIG. 3. The clockwise beam 195 follows the same path as counterclockwise beam 197, but reverse to the order recited for counterclockwise beam 197.

Care is taken so that the phase modulator (not shown) within transmitter section 151 is offset from the center of the optical loop extending from and back to central beamsplitter 165 so that a relative phase difference between the counterpropagating light beams 195 and 197 may be impressed. Second optical receiver section 155, previously described, illustrates the manner of adding additional receiver units to a central transmitter section 151. It is understood that a virtually infinite number of receiver units may be added, receiver section 155 illustrating only one of such additional addable units.

Within receiver section 155, the light source 191 generates light which is coupled into the optical fiber 189. The optical fiber 189 is connected to the depolarizing element 187. Depolarizing element 187 is connected to and directs the light to the central fiber optic beamsplitter 185 which splits the light into a clockwise propagating light beam 198 represented by the directional arrow, and into a counterclockwise propagating light beam 199 represented by the directional arrow. Light beams 198 and 199 are counterpropagating along the same path, as was the case of receiver section 153.

The clockwise propagating light beam 198 propagates via the fiber link 183 to the second fiber optic switch 177. In the case illustrated by FIG. 3, second fiber optic switch 177 is open interrupting the optical circuit. If this switch 177 changes to a closed position with respect to fiber optic link 183 the optical beam 198 would continue through to the phase modulator (not shown) identical to phase modulator 71 of FIG. 1, and the random pathlength generator (not shown) identical to random pathlength generator 73 of FIG. 1.

The first fiber optic switch 175 which, in normal operation would be closed with respect to link 181 when second fiber optic switch 177 is closed with respect to link 183 would now also be switched to allow the beam 198 to propagate back to the central fiber beamsplitter 185 where it would recombine with light beam 199 after light beam 199 had propagated through transmitter section 151 in the opposite direction. Operation of receiver section 155 is identical with that of receiver section 153.

Figure 4:
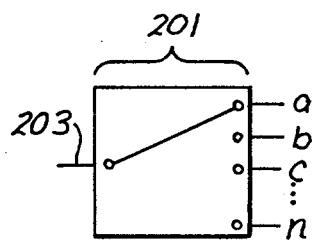
FIG. 4 is block diagram of an optical switch.

FIG. 4 illustrates in diagramatic form an electrooptical or mechanical switch 201 such as might be used for switches 175 and 177. The switch 201 can be of any type which changes the guided direction of a light beam. The switch 201 has an input port 203 and a series of output ports designated by the letters a, b, c, ..., N. The dots illustrate the possibility of an adjustably large finite number of output ports. In FIG. 4, the means of actuating switch 201 are not shown.

In the operation of switch 201, a light beam enters the optical switch 201 via the port 203 and is switched via the action of the switch to one of the output ports a, b, c, ... N. Similarly a light beam could enter in the opposite direction into the port a, b, c, ... N, and be directed or prevented from entering port 203. Switch 201 admits or blocks the light beam depending upon the position of switch 201. Many mechanical and electrooptic versions of these switch 201 are in the literature.

Figure 5:
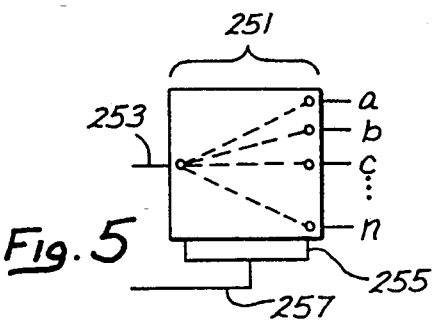
FIG. 5 is a block diagram of an optical switch based on acoustooptical techniques.

FIG. 5 shows a switch 251 based upon the action of an acoustooptic modulator. Similar to FIG. 4, switch 251 of FIG. 5 has an input port 253 and a series of output ports designated by the letters a, b, c, ..., N. The dots illustrate the possibility of an adjustably large finite number of output ports. In FIG. 5, at the bottom of switch 251 is a piezoelectric element 255. Piezoelectric element 255 is connected to an electrical line 257.

In the operation of switch 251, a light beam entering port 253 is deflected to one of the output ports a, b, c, . . . N, by an acoustic wave generated by the piezoelectric element 255 that is driven in turn via an electrical signal from the line 257. Deflection of the light wave is dependent upon the frequency of the piezoelectrically generated acoustic wave. These devices have also been described in detail in the open literature.

Figure 6:
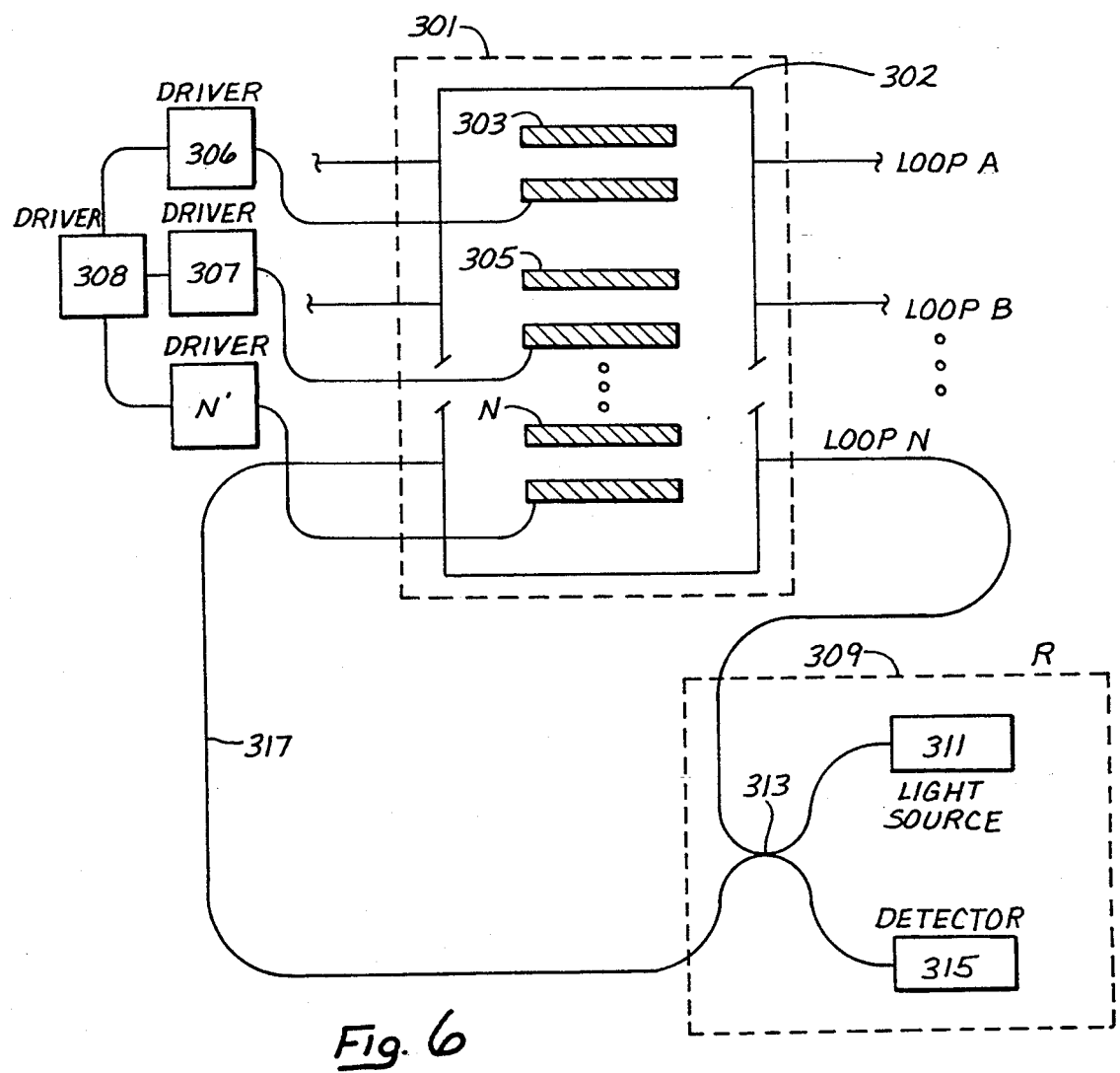
FIG. 6 is a block diagram of a transmitting unit with multiple phase modulators acting to support the transmission of signals to multiple receiving units.

FIG. 6 shows how a single transmitter station 301 may be used to support communication to a series of receiver stations. Transmitter station 301 consists of a series of phase modulators 303, 305, . . . N which support a series of independent loops, labeled A, B, . . . N. Each of the loops A, B, . . . N is connected to a separate receiver station. Each of the phase modulators 303, 305, . . . N are electrically connected to a series of centrally controlled drivers 306, 307 . . . N' to coordinate their sequence of activation. Each of the series of centrally controlled drivers 306, 307 . . . N are electrically and controllably connected to a central controller 308.

As an example the Nth loop is illustrated. A receiver station 309 includes a light source 311. Light source 311 is optically connected to a central fiber optic beamsplitter 313. Central fiber optic beamsplitter 313 is also connected to an output detector 315. The central fiber optic beamsplitter 313 is also connected to the Nth fiber loop. Operation of the system involves the same steps as recited for FIG. 1.

Figure 7:
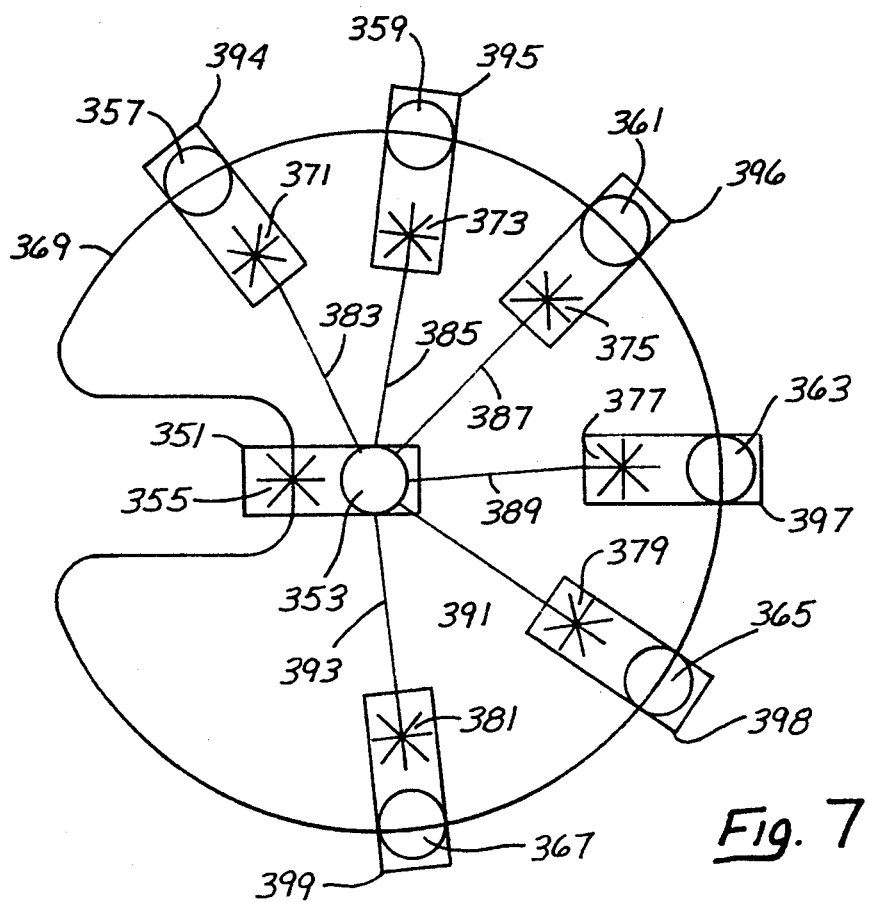
FIG. 7 is a detailed schematic of supporting multiple transmitter/receiver units on a single network with a loop topology.

FIG. 7 illustrates a schematic diagram of a full duplex network constructed using the embodiments described in association with FIGS. 2 and 6. A master transmitter/receiver station 351 is located at the radial center of the diagram. Transmitter/receiver station 351 has a transmitter 353, and a receiver 355. The transmitter 353 has N independent phase modulators in a manner similar to that of the transmitting element 301 of FIG. 6. The receiver portion of the transmitter/receiver station 351 is similar to the receiver 51 shown in FIGS. 1 and 2.

The receiver 355 connects a series of transmitter elements 357, 359, 361, 363, 365 and 367 via a single fiber loop 369. The transmitter 353 connects the receiver elements 371, 373, 375, 377, 379, and 381 via the fiber loops 383, 385, 387, 389, 391, and 393 respectively. In this manner the master transmitter/receiver 351 may be used to interconnect the satellite transmitter/receiver stations 394, 395, 396, 397, 398 and 399 into a full duplex network.

Figure 8:
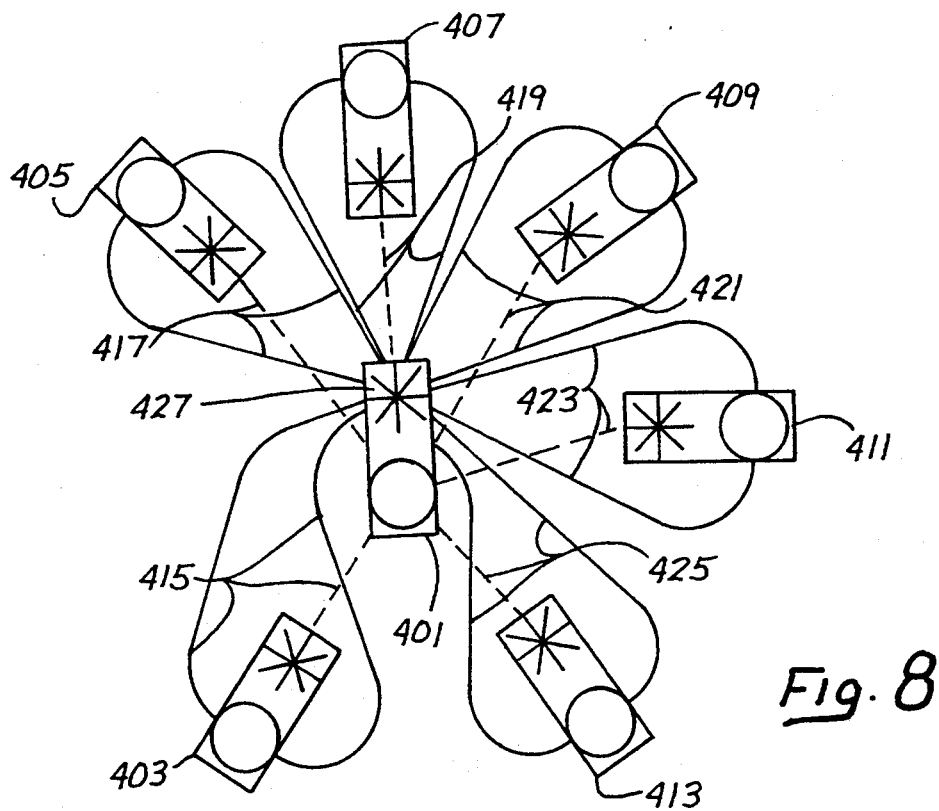
FIG. 8 is a block diagram of a network supporting multiple transmitter/receiver stations using a star topology.

FIG. 8 shows a network constructed with a star configuration. In this case a master transmitter/receiver station 401 connects the several satellite stations 403, 405, 407, 409, 411 and 413 via a number of sets of fiber optic loops, each set represented by 415, 417, 419, 421, 423, and 425 respectively. In this case a master receiver element 427 consists of N independent receiving elements (not shown individually) each equivalent to the element 51 of FIGS. 1 and 2 to support transmission from each of the satellite stations.

Figure 9:
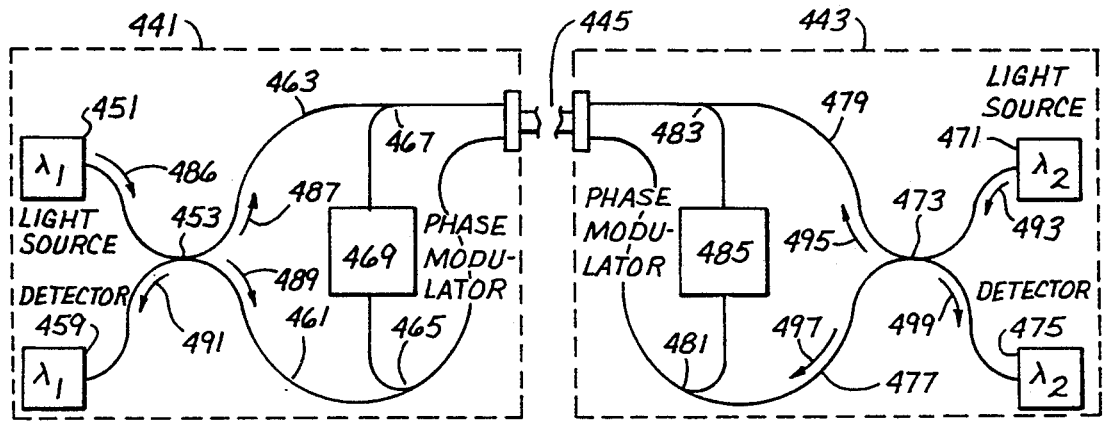
FIG. 9 is a detailed schematic of a full duplex link using wavelength division multiplexing.

FIG. 9 illustrates how wavelength division multiplexing techniques may be used to interconnect two Sagnac interferometer based secure fiber optic communication links. Generally, this is accomplished by establishing two secure communication links that operate simultaneously over the same fiber optic loop at two distinct wavelengths.

In FIG. 9, a pair of transmitter/receivers 441 and 443 are inconnected by a dual fiber cable 445. Within transmitter/receiver 441 a light source 451 operates about a central wavelength $\lambda_1$. Light source 451 is connected to a beamsplitter 453. Beamsplitter 453 is connected back into an output detector 459. Output detector 459 detects light having a central wavelength $\lambda_1$. Two ports of beamsplitter 453 which are not connected to light source 451 and detector 459 are connected to an optic fiber 461 and an optic fiber 463. Optic fibers 461 and 463 extend beyond the boundaries of transmitter/receiver 441 in the form of the dual fiber cable 445.

A wavelength division multiplexer 465 is connected to optic fiber 461 and a wavelength division multiplexer 467 is connected to optic fiber 463. A wavelength division multiplexer is a coupling device which allow the coupling of a given wavelength of light from a specified input port to a specified output port, but intensionally avoids coupling other frequencies to the specified input port. Wavelength division multiplexers 465 and 467 are connected to a phase modulator 469. Wavelength division multiplexers 465 and 467 are oriented to selectively couple light of frequency $\lambda_2$ into phase modulator 469 from fiber cable 445, and into fiber cable 445 from phase modulator 469.

Similarly, transmitter/receiver 443 has a light source 471 which operates about a central wavelength $\lambda_2$. Light source 471 is connected to a beamsplitter 473. Beamsplitter 473 is connected back into an output detector 475. Output detector 475 detects light having a central wavelength $\lambda_2$. The remaining ends of the fiber beamsplitter 473 not connected to the detector 475 are connected to an optic fiber 477 and an optic fiber 479. Optic fibers 477 and 479 extend beyond the boundaries of transmitter/receiver 443 in the form of the dual fiber cable 445.

A wavelength division multiplexer 481 is connected to optic fiber 477 and a wavelength division multiplexer 483 is connected to optic fiber 479. Wavelength division multiplexers 481 and 483 are connected to a phase modulator 485. Wavelength division multiplexers 481 and 483 are oriented to couple light of frequency $\lambda_1$ into phase modulator 485 from fiber cable 445, and into fiber cable 445 from phase modulator 485.

In the manner described above, a full duplex system is formed. In operation of the system of FIG. 9, a first frequency $\lambda_1$ light beam 486 from light source 451 is coupled into beamsplitter 453 which is used to generate counterpropagating light beams 487 and 489. The clockwise propagating first frequency light beam 487 then propagates through dual fiber cable 445 and into transmitter/receiver 443.

Once inside transmitter/receiver 443, the clockwise propagating first frequency light beam 487 then enters wavelength division multiplexer 483 and propagates toward phase modulator 485. The wavelength division multiplexing unit 485 is designed to cross couple light at wavelength $\lambda_1$ only. Consequently, the clockwise propagating first frequency light beam 487 is cross coupled into phase modulator 485.

Phase modulator 485 is offset from the center of the fiber loop formed by and with respect to beamsplitter 453. Phase modulator 485 is used to impress a data stream onto the light beam 487 in the form of phase information. The now phase modulated clockwise propagating first frequency light beam 487 then exits the phase modulator 485 and enters wavelength division multiplexing unit 481. Wavelength division multiplexing unit 481 is designed to cross couple light of wavelength $\lambda_1$. The clockwise propagating first frequency phase modulated light beam 487 then enters fiber optic cable 445 and travels back to the transmitter receiver box 441.

The clockwise propagating first frequency phase modulated light beam $\lambda_1$ then passes unaltered, straight through the wavelength division multiplexing element 465 that is designed not to cross couple light at wavelength $\lambda_1$. The clockwise propagating first frequency phase modulated light beam 487 then completes the loop by returning to the central beamsplitter 453. The counterclockwise propagating first frequency light beam 489 traverses the fiber loop path, just described for the clockwise propagating first frequency light beam 487 but in the opposite direction.

When the two first frequency clockwise and counterclockwise propagating light beams 487 and 489 recombine on the central beamsplitter 453 their relative phase difference due to the impressed data stream results in an amplitude modulated signal light beam 491 which then propagates to the output detector 459 designed for detection of optical radiation at wavelength.

The transmitter receiver box 443 operates in a manner analogous to the box 441. Here the light source 471 emits a beam of light 493 at a second wavelength, $\lambda_2$. The second wavelength light 493 is then coupled into the central beamsplitting element 473 which acts to generate the counterpropagating second frequency beams of light 495 and 497.

The counterclockwise propagating second frequency light beam 495 passes through wavelength division multiplexing element 483 without alteration. Wavelength division multiplexing element 483 is designed not to cross couple light at the second wavelength $\lambda_2$. The light beam 495 then leaves the transmitter receiver box 443 and propagates across the fiber optic cable 445 to the transmitter receiver box 441.

The second frequency counterclockwise propagating light beam 495 is then cross coupled by the wavelength division multiplexing element 467 which is designed to cross couple light at the second wavelength into phase modulator 469. Phase modulator 469 is offset from the center of the loop formed by beamsplitter 473 and traversed by the second frequency counterpropagating light beams 495 and 497. A relative phase difference between the second frequency counterpropagating light beams 495 and 497 may is impressed by phase modulator 469 in a manner to transmit data.

After passing through the phase modulator 469 the second frequency counterclockwise propagating light beam 495 enters wavelength division multiplexing element 465. Wavelength division multiplexing element 465 is designed to cross couple light at the second wavelength. The second frequency counterclockwise propagating light beam 495 then enters fiber optic cable 445 and reenters the transmitter receiver box 443.

The second frequency counterclockwise propagating light beam 495 then passes through the wavelength division multiplexing element 481 unaltered. Wavelength division multiplexing element 481 is designed not to cross couple light at the second wavelength $\lambda_2$. The second frequency counterclockwise propagating light beam 495 then returns to the fiber optic beamsplitter 473 completing the fiber optic loop. The second frequency clockwise propagating light beam 497 traverses the fiber optic loop, described above for the second frequency counterclockwise propagating light beam 495, in the opposite direction through the same elements.

The second frequency clockwise and counterclockwise propagating light beams 497 and 495 then recombine interferometrically in the fiber optic beamsplitter 473 generating an amplitude modulated light beam 499 which then propagates into output detector 475. Output detector 475 is designed for operation at the second wavelength $\lambda_1$. In this manner the transmitter/receivers 441 and 443 in combination with the fiber optic cable 445 form a full duplex communication unit.

Figure 10:
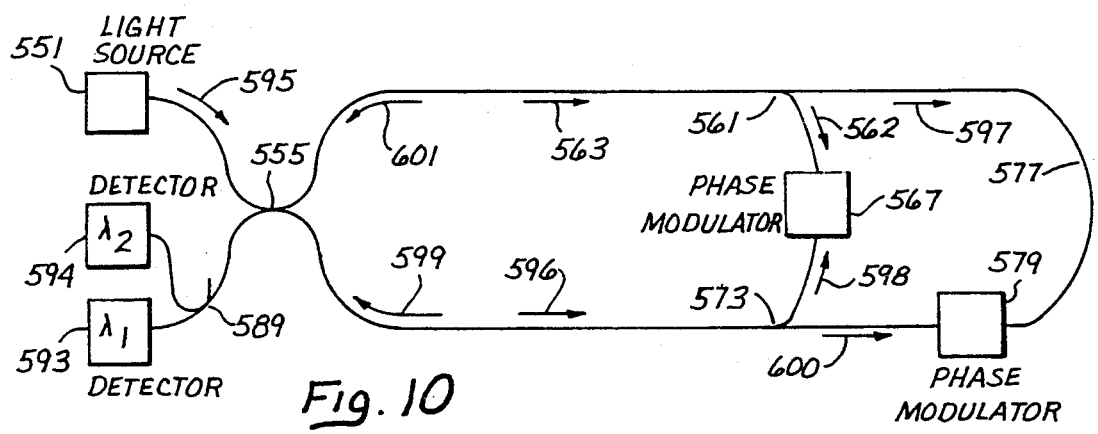
FIG. 10 is a detailed schematic of a Sagnac interferometer based secure communication link using wavelength division multiplexed bypasses to support multiple transmitter stations.

FIG. 10 illustrates how wavelength division multiplexing techniques may be used to support continuous transmission to a receiver. A light source 551 is connected to a central fiber optic beamsplitter 555. The central fiber optic beamsplitter 555 forms a path for the counterpropagating beams of light. Connected to central fiber optic beamsplitter 555, and also forming the path is a wavelength division multiplexing element 561.

Wavelength division multiplexing element 561 is structurally designed to split off a portion 592 of the clockwise propagating light beam 563. A phase modulator 567 is connected to one port of wavelength division multiplexing element 561. The opposite side of the phase modulator 567 is connected to a wavelength division multiplexing element 573.

Wavelength division multiplexing element 561 also is connected to a length of fiber 577. Fiber 577 is connected to a phase modulator 579. Phase modulator 579 is connected to one port of the wavelength division multiplexing element 573. Another port of wavelength division multiplexing element 573 is connected back to central beam splitter 555.

Central beamsplitter 555 is connected to a wavelength division multiplexing element 589. Wavelength division multiplexing element 589 is designed to transmit light centered at a first wavelength $\lambda_1$ without cross coupling and thus directs a first wavelength light beam in one direction and all other wavelengths in another direction. The port of wavelength division multiplexing element 589 designed to couple the first frequency of light is connected to detector 593. Another port of wavelength division multiplexing element 589 is connected to a detector 594.

The operation of FIG. 10 illustrates how wavelength division multiplexing techniques may be used to support continuous transmission to a receiver. A light source 551 is used to generate a spectrally broadband light beam which enters central fiber optic beamsplitter 555. Central fiber optic beamsplitter 555 generates the counterpropagating broadband frequency beams of light 563 and 596.

The broadband clockwise propagating light 563 enters the wavelength division multiplexing unit 561 that splits off a portion 562 of the clockwise propagating broadband beam 563 into the phase modulator 567. The frequency band of light split off can be broadband subset of the light emitted by the light source. For purposes of discussion, a first frequency band will be considered to be split off, and the remainder 597 of the broadband beam 563 allowed to propagate. The remainder 397 of the broadband beam allowed to propagate will be referred to as a second frequency band 597.

The first frequency band 562 of clockwise propagating light 563 is split off and continues into the phase modulator 567. The phase modulator 567 is offset from the center of the loop formed with respect to central beamsplitter 555 to allow relative phase modulation between counterpropagating first frequency light beams. The clockwise propagating first frequency band light beam 562 then enters wavelength division multiplexing element 573.

Meanwhile, the remainder of the broadband clockwise propagating light not split off by wavelength division multiplexing unit 561, the second frequency band 597, continues through fiber 577 into phase modulator 579. The phase modulator 579 is offset from the center of the loop formed with respect to central beamsplitter 555 to allow relative phase modulation between counterpropagating second frequency light beams 597 and 598. The clockwise propagating second frequency band light beam 597 then enters wavelength division multiplexing element 573.

Wavelength division multiplexing element 573 recombines the clockwise propagating first frequency band light beam 562 with the second frequency band clockwise propagating light beam 597 to re-form a broadband, but modulated clockwise propagating light beam 599. The broadband clockwise beam 599, made up of the separately modulated, clockwise propagating first and second frequency band light beams 562 and 597, then travels back central beamsplitter 555.

The counterclockwise propagating broadband beam of light emanating from central beamsplitter 555 traverses the same path and undergoes the same frequency separations as the clockwise propagating broadband beam of light, but in reverse order. In the counterclockwise propagating case, the first frequency band light beam 598 is split out by wavelength division multiplexing element 573, passes through and is modulated by phase modulator 567. The second frequency band light 600 is split out by wavelength division multiplexing element 573, passes through and is modulated by phase modulator 579. Both the modulated first and second frequency band counterclockwise propagating light beams 598 and 600 are then recombined by wavelength division multiplexing element 561, and return to central beamsplitter 555.

Both the modulated clockwise and counterclockwise separately modulated light beams 599 and 601 recombine upon central beamsplitter 555. Because of the relative phase difference of the recombined clockwise and counterclockwise separately phase modulated light beams induced by the phase modulators 567 and 579, an amplitude modulated light beam 601 is formed which is directed to the wavelength division multiplexing element 589.

Wavelength division multiplexing element 589 is designed to direct light having a first frequency band to detector 593 and to allow all other light to propagate to detector 594. It is understood that many light wave division schemes can be incorporated. In the foregoing example, first frequency band was extracted from a broadband beam, and modulated apart from the light from which it was taken. Similarly, two sharp, distinct and even wide frequency separated light beams can be incorporated within the methods recited herein. Alternately, a broadband light beam can be split into a first and a second band of frequencies for separate modulation. This method can also be extended to N operating loops which cause N frequency band subsets to be split out, and having N frequency band detectors. Such a scheme could use broadband light sources and wavelength division multiplexing units such as fiber optic grating elements and narrow spectrum fiber beamsplitters.

Figure 11:
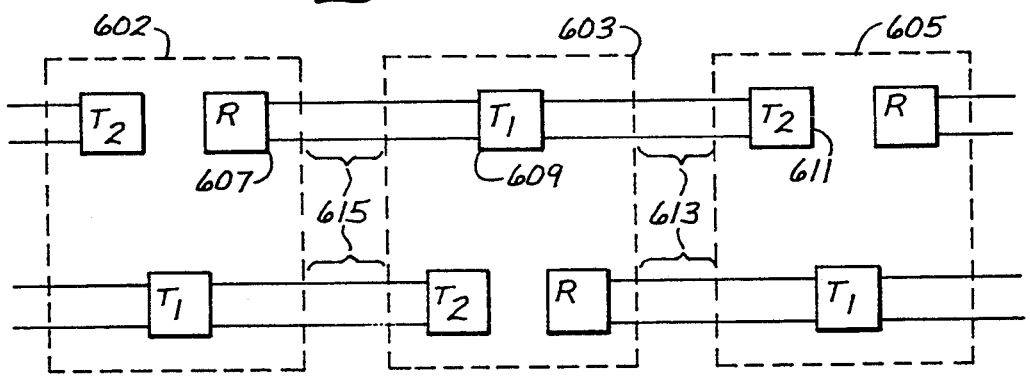
FIG. 11 is a detailed schematic of how the wavelength division multiplexed links with optical bypasses to support multiple transmitter stations.

FIG. 11 shows a single, two-transmitter loop similar to that described in FIG. 10, and how sets of this two loops configuration can be staggered to implement a fault-tolerant network. The primary advantage of this topology is a reduction of the number of receiver/transmitters required per station.

Specifically FIG. 11 illustrates a set of three network nodes 602, 603 and 605. These nodes may be three out of N nodes for the total network. Nodes 602, 603 and 605 are interconnected by receiving and transmitting elements, designated by R and T, respectively, similar to those described in association with FIG. 10 above. A receiver 607 is within node 602, a transmitter 609 is within node 603, and a transmitter 611 is within node 605. These elements are interconnected by two sets of dual fiber cables 613 and 615. Transmitters 609 and 611 of FIG. 11 are analogous to phase modulators 567 and 579 of FIG. 10, respectively. Receiver 607 is analogous to the left half of FIG. 10, namely beamsplitter 555, light source 551, and detectors 593 and 594. Should a node like node 603 fail, data can still be transmitted from node 605 to node 602.

Figure 12:
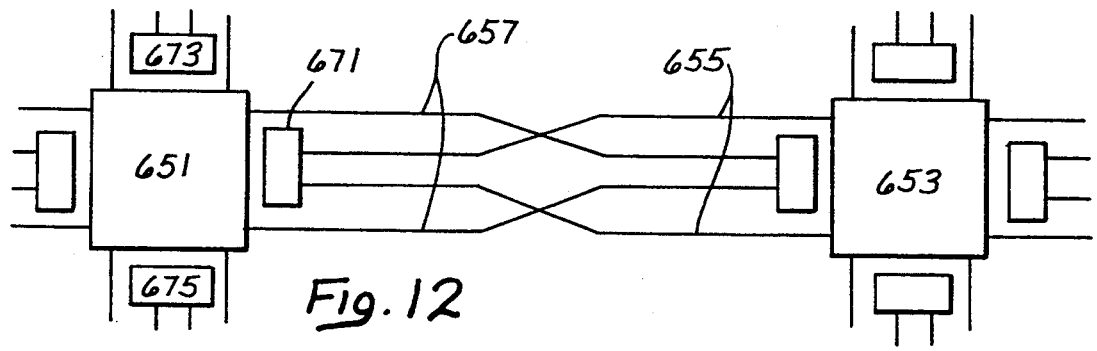
FIG. 12 is a detailed schematic of a wavelength division multiplexed grid network.

FIG. 12 shows a grid network that provides multiple paths between stations and allows broadcasting to adjacent stations. Wavelength division multiplexing couplers (not shown) are used to multiplex four receiver/source light paths onto the modulator. FIG. 12 shows a typical interconnection of three stations and the branches that can be connected to other stations.

FIG. 12 illustrates a grid topology for the network consisting of master transmitter/receiver boxes 651 and 653 that are interconnected via two sets of dual fiber optic cables 655 and 657. Each of the master boxes are also interconnected to other master boxes in a two dimensional pattern to form the grid network. The boxes 671, 673 and 675 are transmitting stations with phase modulators. Each of the master boxes 651 and 653 contains four sets of receivers, and controls the transmitting stations which lie adjacent. Master boxes 651 and 653 also control the interface to the network users.

Figure 13:
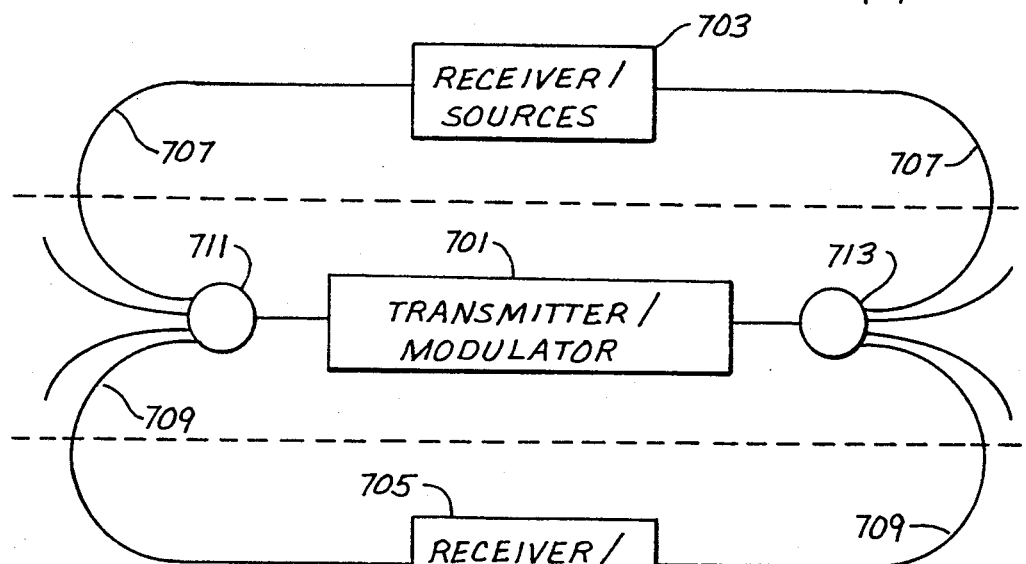
FIG. 13 is a block diagram of a wavelength division multiplexed transmitter module supporting multiple receivers.

FIG. 13 details a multiplexed phase modulator/transmitter. This topology compounds the complexity of the wavelength division multiplexed full duplex link of FIG. 9, since four different wavelength light sources (not shown) are required.

FIG. 13 shows a master transmitter module 701 connected to receiver/sources 703 and 705 via the fiber loops 707 and 709 through wavelength division multiplexing elements 711 and 713. An output from master transmitter module 701 is sent to the receiver/sources 703 and 705 through fiber loops 707 and 709. To separate the loop signals, each of the receiver/sources 703 and 705 operates on a different wavelength and the loops are thereby separated by the wavelength division multiplexing elements 711 and 713.

Figure 14:
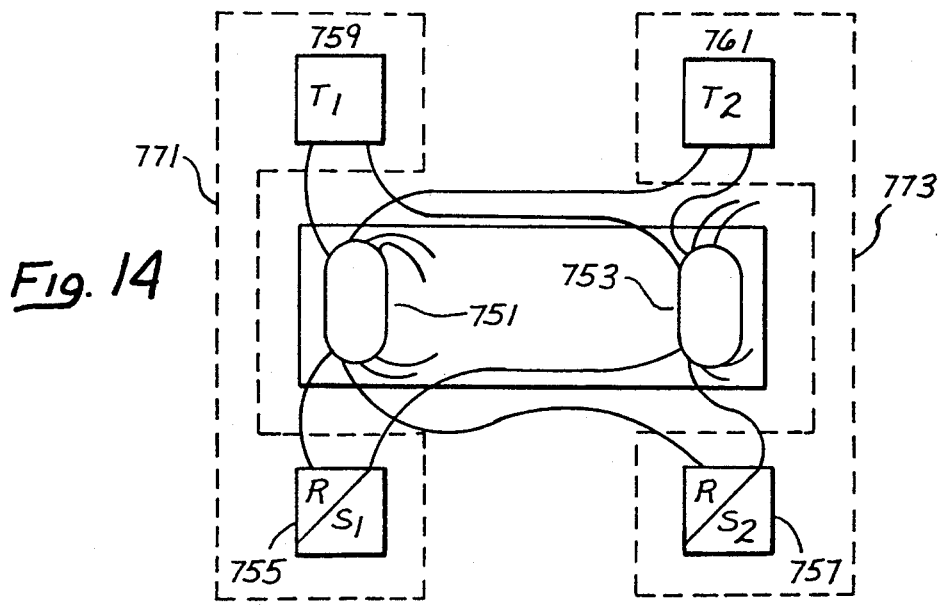
FIG. 14 is a detailed schematic of a broadcast network based on the usage of star couplers.

FIG. 14 illustrates a star topology. A star coupler 751 and a star coupler 753 interconnect a pair of receiver/sources 755 and 757 to a pair of transmitter modules 759 and 761. Due to the limitations inherent in attempting to show a multidimensional star on a two dimensional medium, only a pair of units 771 and 773, designated by the dashed lines, are illustrated in FIG. 14. It is clear from FIG. 14, however, that in this manner N receiver/source and N transmitter modules forming N units could be interconnected.

The star topology shown in FIG. 14 reduces the overall loop loss through one transmitter. Again, the network protocol must be complex to avoid collisions. The star couplers usually operate under conditions of single point failure and must be located within one of the stations to be secure. Additional stations can be added to this network by increasing the number of ports on the couplers 751 and 753.

The foregoing disclosure and description of the invention are illustrative and explanatory thereof, and various changes in the optical circuit elements, light beam conditioning devices, and means of separating light of one frequency from light of another frequency, such as wavelength division multiplexing, as well as all other details, including communicative configurations and schemes, of and concerning the illustrated inventive methods and configurations may be made without departing from the spirit and scope of the invention.

We claim:

1. A full duplex secure fiber optic network comprising:

first light source means for producing a first beam of light having a first frequency band;

first beam splitting means having:
a first port fiber optically connected to said first light source means, for receiving said first beam of light from said first light source means;
second and third ports for splitting said first beam of light into a second and a third beam of light, respectively; and
a fourth port for recombining said second and said third beams into a fourth beam of light;

first detection means, fiber optically connected to said fourth port of said beamsplitting means, for detecting momentary and steady state phase shifts of said second and said third beams of light from said fourth light beam recombined at said fourth port of said beam splitting means;

second light source means for producing a fifth beam of light having a second frequency band;

first frequency selective coupling means for selectively directing received light of said first and second frequency bands having:
first, second and third ports, said first port of said first frequency selective coupling means being connected to said second port of said first beam splitting means;

second frequency selective coupling means for selectively directing received light of said first and second frequency bands having:
first, second and third ports, said first port of said second frequency selective coupling means being connected to said third port of said first beam splitting means, wherein said first and said second frequency selective coupling means are constructed to selectively couple said second frequency band of light when present at their third ports into their second ports;

first phase modulation means, fiber optically connected to said second port of said first frequency selective coupling means and to said second port of said second frequency selective coupling means, for impressing a frequency change on said second frequency band of light, and wherein said first light source means, said first beam splitting means, said first frequency selective coupling means, said second frequency selective coupling means, said first phase modulation means and said first detection means form a first transceiver station;

second beam splitting means having:
a first port fiber optically connected to said second light source means, for receiving said fifth beam of light from said second light source means;
second and third ports for splitting said fifth beam of light into a sixth and a seventh beam of light, respectively; and
a fourth port for recombining said sixth and said seventh beams into a eighth beam of light;

second detection means, fiber optically connected to said fourth port of said second beamsplitting means, for detecting momentary and steady state phase shifts of said sixth and said seventh beams of light from said eighth light beam recombined at said fourth port of said second beam splitting means;

third frequency selective coupling means for selectively directing received light of said first and second frequency bands having:
first, second and third ports, said first port of said third frequency selective coupling means being connected to said second port of said second beam splitting means;

fourth frequency selective coupling means for selectively directing received light of said first and second frequency bands having:
first, second and third ports, said first port of said fourth frequency selective coupling means being connected to said third port of said second beam splitting means, wherein said third and said fourth frequency selective coupling means are constructed to selectively couple said first frequency band of light when present at their third ports into their second ports;

second phase modulation means, fiber optically connected to said second port of said third frequency selective coupling means and to said second port of said fourth frequency selective coupling means, for impressing a frequency change on said first frequency band of light, and wherein said second light source means, said second beam splitting means, said third frequency selective coupling means, said fourth frequency selective coupling means, said second phase modulation means and said second detection means form a second transceiver station; and a fiber optic cable having:
first and a second waveguides, said first waveguide being connected between said third port of said first frequency selective coupling means and said third port of said third frequency selective coupling means, said second waveguide being connected between said third port of said second frequency selective coupling means and said third port of said fourth frequency selective coupling means.

2. A secure fiber optic network comprising:

at least one fiber optic loop having:
a first loop end; and
a second loop end;

a first receiver section including:
first light source means for producing a first beam of light;
first beam splitting means having:
a first terminal connected to said first light source means, for receiving said first beam of light from said first light source means;
a second terminal connected to said first loop end;
a third terminal connected to said second loop end; and
a fourth terminal, said first beam splitting means splitting said beam of light into a second and a third beam of light which are output at said second and third terminals respectively and recombining said second and said third beams after said second and third beams have transited said at least one fiber optic loop and reappeared at said third and second terminals respectively into a fourth beam of light; and
first detection means connected to said fourth terminal of said first beam splitting means, for detecting said fourth light beam; and a first transmitter section including:

first switch means connected to said second terminal of said first beam splitting means;

second switch means connected to said third terminal of said first beam splitting means; and first phase modulation means connected between said first and second switch means, said first and second switch means switching said first phase modulator means into said at least one fiber optic loop so that said first phase modulation means can impress information on said second and third beams of light.

3. The secure fiber optic network of claim 2 further comprising:

first control means connected to said first phase modulation means for selectively activating said first phase modulation means.

4. The secure fiber optic network of claim 2 wherein said first light source means includes a light source chosen from a group consisting of:

a superradiant diode;
a light emitting diode;
a laser diode; and
a fiber laser.

5. The secure fiber optic network of claim 2 further comprising:

multiple receiver sections similar to said first receiver section connected to said first transmitter section by said first and second switch means.

6. The secure fiber optic network of claim 2 further including:

second phase modulation means;
second detection means; and
detection wavelength division multiplexing means having:
 a first terminal optically connected to said first beam splitting means;
 a second terminal optically connected to said first detection means; and
 a third terminal connected to said second detection means, wherein said first light source means produces light at least at two separate frequencies whereby said fourth beam of light is separated by said detection wavelength division multiplexing means so that light at a first frequency is directed to said first detection means and so that light at a second frequency is directed to said second detection means, and wherein said first switch means include:
first wavelength division multiplexing means having:
 a first terminal optically connected to said second beam of light;
 a second terminal optically connected to said first phase modulation means; and
 a third terminal connected to said second phase modulation means, and wherein said second switch means include:
second wavelength division multiplexing means having:
 a first terminal optically connected to said third beam of light;
 a second terminal optically connected to said first phase modulation means; and
 a third terminal connected to said second phase modulation means, whereby light at said first frequency in said second and third beams in modulated by said first phase modulation means and light at said second frequency in said second and third beams in modulated by said second phase modulation means.

7. The secure fiber optic network of claim 6 wherein said network is a first fiber optic network and including:

a second network similar to said first fiber optic network; and a third network similar to said first fiber optic network, wherein said first receiver section of said first fiber optic network is located with said first modulation means of said second fiber optic network, and are jointly controlled; said first receiver section of said third fiber optic network is located with said first modulation means of said first fiber optic network and said second modulation means of said second fiber optic network, and are jointly controlled; and said first modulation means of said third fiber optic network are located with said second modulation means of said first fiber optic network, and are jointly controlled.

8. The secure fiber optic network of claim 2 further including:

second light source means that produces light at a second frequency second phase modulation means;
second detection means;
second beam splitter means;
third switch means; and
fourth switch means, wherein said first light source means produces light at a first frequency, wherein said first switch means include:
first wavelength division multiplexing means having:
 a first terminal optically connected to said first beam splitter means to receive said second beam of light therefrom;
 a second terminal optically connected to said first phase modulation means; and
 a third terminal connected to said second beam splitter means, wherein said second switch means include:
second wavelength division multiplexing means having:
 a first terminal optically connected to said first beam splitter means to receive said third beam of light therefrom;
 a second terminal optically connected to said first phase modulation means; and
 a third terminal connected to said second beam splitter means, whereby light at said first frequency in said second and third beams from said first beam splitter means is modulated by said first phase modulation means, wherein said third switch means include:
third wavelength division multiplexing means having:
 a first terminal optically connected to said second beam splitter means to receive said second beam of light therefrom;
 a second terminal optically connected to said second phase modulation means; and
 a third terminal connected to said first beam splitter means, wherein said fourth switch means include:
fourth wavelength division multiplexing means having:
 a first terminal optically connected to said second beam splitter means to receive said third beam of light therefrom;

a second terminal optically connected to said second phase modulation means; and a third terminal connected to said first beam splitter means, whereby light at said second frequency in said second and third beams from said second beam splitter means is modulated by said second phase modulation means.

9. The secure fiber optic network of claim 8 wherein:

said first phase modulation means is located with said second light source means, said second detection means, said second beamsplitter, said first wavelength division multiplexing means, and said second wavelength division multiplexing means; and said second phase modulation means is located with said first light source means, said first detection means, said first beamsplitter, said third wavelength division multiplexing means, and said fourth wavelength division multiplexing means.

10. The secure fiber optic network of claim 2 wherein said first and second switch means include:

acoustooptical switches.

11. The secure fiber optic network of claim 2 wherein said first and second switch means each have:

a first side having a first connection to said first phase modulation means; and a second side having:

one through n th connections to which said first side first connection can be switched, said secure fiber optic network further comprising:

second through n th receiver sections similar to said first receiver section, said first through nth receiver sections being connected to said first through n connections of said first and second switch means, whereby said first phase modulation means are connectable to any of said first through n th receiver sections.

12. The secure fiber optic network of claim 11 including:

second through n th phase modulation means located adjacent said first through n−1 th receiver sections respectively and said first phase modulation means being located adjacent said n receiver section; said two through n th phase modulation means being connected in a optical loop with said first receiver section.

13. The secure fiber optic network of claim 2 wherein said first and second switch means each have:

a first side having a first connection to said first receiver section; and a second side having:

one through n th connections to which said first side first connection can be switched, said secure fiber optic network further comprising:

second through n th phase modulation means similar to said first phase modulation means, said first through n th phase modulation means being connected to said first through n th connections of said first and second switch means, whereby said first receiver section is connectable to any of said first through n th phase modulation means.

14. The secure fiber optic network of claim 2 including:

second through n th transmitter sections; and second through n th receiver sections located adjacent said first through n th−1 transmitter sections respectively, and said first receiver section being located adjacent said n th transmitter section; said two through n receiver sections being connected to said first receiver section and said n th transmitter section being connected to said second through nth receiver sections.

15. A secure fiber optic network including:

a first receiver portion having:

a source of light that produces at least a first frequency of light;

a detector capable of detecting light at said first frequency; and light mixing means operatively connected to said source of light to produce therefrom at least a first and second output light beam pair and to mix said first and second output light beams of said pair upon their return into a first receiver beam of light and operatively connecting said first receiver beam of light to said detector;

connection means for said first and second beams of light having:

first light transmission means; and second light transmission means, said first and second light transmission means having different path lengths; and a first transmitter portion operatively connected to said connection means having:

a light modulator connected to receive at least one output light beam pair and to modulate identical information onto the light beams thereof.

16. The secure fiber optic network of claim 15 further including:

a second receiver portion having:

a source of light that produces at least said first frequency of light;

a detector capable of detecting light at said first frequency; and light mixing means operatively connected to said source of light to produce therefrom at least third and fourth output and to mix said at least third and fourth output light beams of said pair upon their return into a second receiver beam of light, and operatively connecting said second receiver beam of light to said detector thereof, and wherein said connection means further include:

switch means to alternately connect said first and second output beam pair or said third and fourth output beam pair to said first transmitter portion.

17. The secure fiber optic network of claim 16 further including:

a second transmitter portion operatively connected to said connection means having:

a light modulator connected to receive at least one output light beam pair and to modulate identical information onto the light beams thereof, and wherein said switch means of said connection means including means to connect said first and second output beam pair or said third and fourth output beam pair to said second transmitter portion.

18. The secure fiber optic network of claim 16 further including:

a second transmitter portion operatively connected to said connection means having:

a light modulator connected to receive at least one output light beam pair and to modulate identical information onto the light beams thereof, and wherein said switch means of said connection means including means to connect said first and second output beam pair and said third and fourth output beam pair to said second transmitter portion.

19. The secure fiber optic network of claim 18 wherein said switch means include:
   first and second adjacently positioned phase modulators, said first phase modulator being optically connected to said first receiver portion and said second phase modulator being optically connected to said second receiver portion; and
   control means connected to said first and second adjacently positioned phase modulators for individually controlling the phase modulation of each of said first and second adjacently positioned phase modulators.

20. The secure fiber optic network of claim 19 wherein said first and second adjacently positioned modulators are encased in a single piece of material.

21. The secure fiber optic network of claim 19 wherein said control means include:
   first and second electrical actuators, said first electrical actuator being electrically connected to said first adjacently oriented phase modulator, and said second electrical actuator being electrically connected to said second adjacently oriented phase modulator; and
   a controller, electrically connected to said first and second electrical actuators to selectively control said first and second electrical actuators.

22. The secure fiber optic network of claim 15 including:
   second through n receiver portions each having:
     a source of light that produces light at at least one predetermined frequency;
     a detector capable of detecting light at said at least one predetermined frequency; and
     light mixing means operatively connected to said source of light to produce therefrom a pair of identical light output beams and to mix said light beams in said pair upon their return into a receiver beam of light and operatively connecting said receiver beam of light to said detector, wherein said connection means connecting all of said light beam pairs to said first transmitter portion for modulation thereby.

23. The secure fiber optic network of claim 22 including:
   second through n transmitter portions operatively connected to said first receiver means through said connection means, each of said second through n transmitter portions having:
     a light modulator connected to receive at least one output light beam pair from said first receiver portion and to modulate identical information onto the light beams thereof.

24. The secure fiber optic network of claim 23 wherein said first receiver portion is physically adjacent to said second transmitter portion, said nth receiver portion is physically adjacent said first transmitter portion.

25. The secure fiber optic network of claim 24 wherein said connection means connect said third through nth and first transmitter portion in series.

26. The secure fiber optic network of claim 24 wherein said connection means connect said third through nth and first transmitter portion in parallel.

27. The secure fiber optic network of claim 15 wherein said first receiver portion light source produces light at a first frequency, said network further including:
   a second receiver portion having:
     a source of light that produces a second frequency of light;
     a detector capable of detecting light at said second frequency; and
     light mixing means operatively connected to said source of second frequency light to produce therefrom third and fourth output beams and to mix said third and fourth output light beams upon their return into a second receiver beam of light, and operatively connecting said second receiver beam of light to said detector thereof; and
   a second transmitter portion operatively connected to said connection means having:
     a light modulator connected to receive said third and fourth output light beams and to modulate identical information onto said third and fourth output light beams, and wherein said connection means further include:
     frequency sensitive means to separate said first and second output beams from said third and fourth output beams whereby said output beams can travel on the same connections, said first receiver portion and said second transmitter portion being located physically adjacent and said second receiver portion and said first transmitter portion being located physically adjacent.

28. The secure fiber optic network of claim 15 wherein said first receiver portion light source produces light at first and second frequencies, and wherein said first receiver portion includes:
   a second detector capable of detecting light at said second frequency; and
   means to direct light at said first frequency to said first detector and light at said second frequency to said second detector, said network further including:
   a second transmitter portion, said connection means connecting light at said second frequency to said second transmitter portion and light at said first frequency to said first transmitter portion, said second transmitter portion having:
     a light modulator first and second output light beams at said second frequency and to modulate identical information onto said first and second output light beams at said second frequency.

29. The secure fiber optic network of claim 28 further including a plurality of similar networks where generally each of said receiver portions is physically located adjacent a first transmitter portion of another network and a second transmitter portion of still another network.

30. The secure fiber optic network of claim 15 wherein said connection means include:
   at least two star couplers.

* * * * *